US012507919B2

(12) United States Patent
Grangeat et al.

(10) Patent No.: US 12,507,919 B2
(45) Date of Patent: Dec. 30, 2025

(54) PORTABLE DEVICE FOR ESTIMATING THE PARTIAL PRESSURE OF BLOOD GAS

(71) Applicant: COMMISSARIAT À L'ENERGIE ATOMIQUE ET AUX ÉNERGIES ALTERNATIVES, Paris (FR)

(72) Inventors: Pierre Grangeat, Grenoble (FR); Marc Accensi, Grenoble (FR); Sadok Gharbi, Grenoble (FR); Henri Grateau, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 941 days.

(21) Appl. No.: 17/617,526

(22) PCT Filed: Jun. 4, 2020

(86) PCT No.: PCT/EP2020/065523
§ 371 (c)(1),
(2) Date: Dec. 8, 2021

(87) PCT Pub. No.: WO2020/249466
PCT Pub. Date: Dec. 17, 2020

(65) Prior Publication Data
US 2022/0248992 A1    Aug. 11, 2022

(30) Foreign Application Priority Data
Jun. 9, 2019   (FR) ........................................ 1906142

(51) Int. Cl.
*A61B 5/1455* (2006.01)
*A61B 5/00* (2006.01)
(Continued)

(52) U.S. Cl.
CPC ........ *A61B 5/14552* (2013.01); *A61B 5/1491* (2013.01); *A61B 5/6824* (2013.01); *G01N 21/3504* (2013.01)

(58) Field of Classification Search
CPC . A61B 5/14552; A61B 5/1491; A61B 5/6824; A61B 5/14551; A61B 5/14542; G01N 21/3504
See application file for complete search history.

(56) References Cited

U.S. PATENT DOCUMENTS

| 3,987,303 A | 10/1976 | Stoft |
| 4,220,158 A | 9/1980 | Delpy et al. |
(Continued)

FOREIGN PATENT DOCUMENTS

FR    2 408 353 A1    6/1979

OTHER PUBLICATIONS

International Search Report issued on Aug. 25, 2020 in PCT/EP2020/065523 filed Jun. 4, 2020, 2 pages.

*Primary Examiner* — Abid A Mustansir
(74) *Attorney, Agent, or Firm* — Oblon, McClelland, Maier & Neustadt, L.L.P.

(57) ABSTRACT

A measuring device, intended to be placed on the skin of a human-being or animal user, the device extending between a contact face and a far end, the device including a side wall that extends between the contact face and the far end, on the contact face, at least one aperture to collect a gas of interest emitted through the skin, the aperture being produced through the contact face; a collecting chamber that extends between the contact face and a measuring chamber; a gas sensor, placed in the measuring chamber, to measure a concentration of gas of interest flowing through the measuring chamber; a processing unit, to estimate a gas-of-interest content in the body of the user based on the measurement taken by the gas sensor; a heat source to bring (Continued)

the contact face to a temperature above 37° C.; and an air intake produced through the side wall to admit ambient air into the duct.

20 Claims, 6 Drawing Sheets

(51) Int. Cl.
*A61B 5/1491* (2006.01)
*G01N 21/3504* (2014.01)

(56) References Cited

U.S. PATENT DOCUMENTS

| | | | |
|---|---|---|---|
| 4,840,179 A * | 6/1989 | Ullrich | A61B 5/1477 600/326 |
| 2001/0034479 A1 | 10/2001 | Ring et al. | |
| 2010/0130842 A1 | 5/2010 | Hayoz et al. | |
| 2010/0133100 A1 * | 6/2010 | Scarano | G01N 33/4925 204/403.01 |
| 2013/0281806 A1 * | 10/2013 | Rao | A61B 5/14552 600/326 |
| 2016/0007894 A1 * | 1/2016 | Kahlman | G01N 21/59 600/323 |
| 2016/0151009 A1 | 6/2016 | Rudmann et al. | |

\* cited by examiner

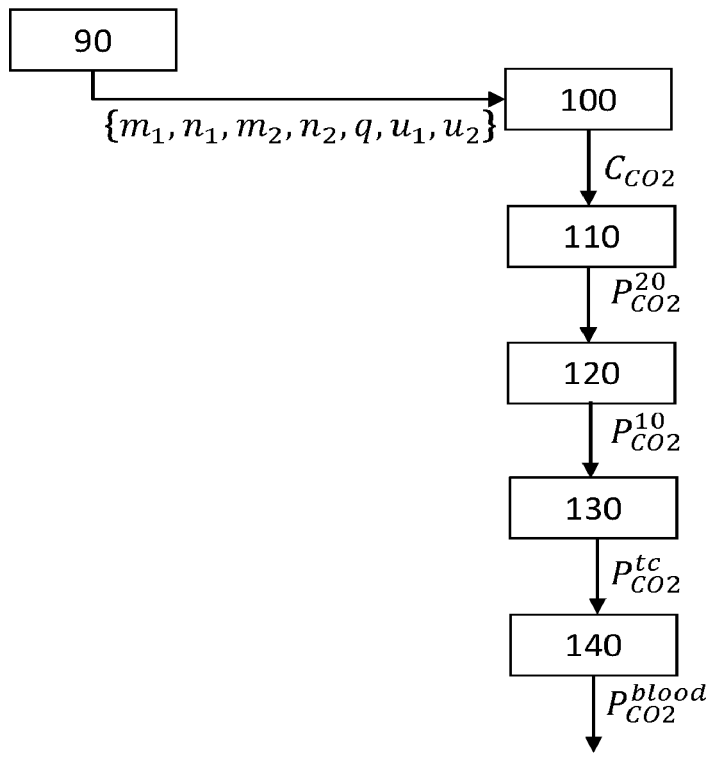
Fig. 5
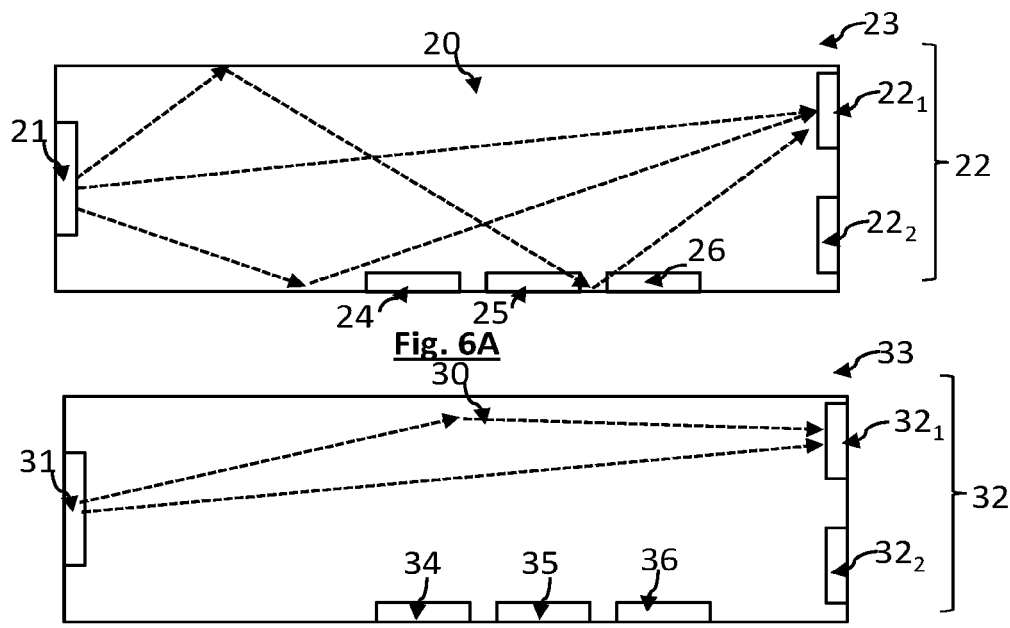
Fig. 6A
Fig. 6B

PORTABLE DEVICE FOR ESTIMATING THE PARTIAL PRESSURE OF BLOOD GAS

TECHNICAL FIELD

The technical field of the invention is measurement of a gas given off by the skin of a living being using a compact device, with a view to estimating physiological parameters, and in particular the content of carbon dioxide dissolved in the blood. The gas may notably be carbon dioxide.

PRIOR ART

Certain respiratory diseases affect gas exchanges between blood and exhaled air. Said exchanges may also be modified during resuscitation. The blood contains dissolved gases, including oxygen and carbon dioxide, the respective partial pressures of which reflect the gas exchanges occurring in the lungs, said exchanges usually being designated by the term "hematosis". In a normal subject, the partial pressure of $CO_2$ is generally comprised between 35 and 45 mmHg, or between 4.8 and 5.8 kPa.

To evaluate the amount of $CO_2$ dissolved in the blood, a blood sample may be taken. This is an invasive method, which may be painful and tricky to apply, in particular in neonatology. In addition, it may only be applied discretely. Despite these drawbacks, its reliability has been validated by the medical profession and it is a reference method.

Another method is to estimate the content of $CO_2$ in the blood non-invasively, by measuring the partial pressure of $CO_2$ diffusing through tissues, and notably the skin. This type of transcutaneous analysis was introduced in the 1980s. Transcutaneous analysis allows continuous monitoring to be performed, for example with a view to observing the immediate effects of a treatment. It may also allow the times at which precise quantification, by blood sampling, is necessary to be determined. It will thus be understood that invasive and non-invasive methods may be combined: one is precise and discrete, whereas the other may be implemented continuously.

Compact devices allowing transcutaneous $CO_2$ to be measured have already been described. Mention will be made, for example, of the publication Eletr S "Cutaneous monitoring of systemic $PCO_2$ on patients in the respiratory intensive care unit being weaned from the ventilator", Acta Anaesthesiol Scand, vol. 22, no 68, pp 123-127, 1978.

The invention described below is an improvement on existing devices. It employs a non-invasive measuring device, worn by a user, to estimate a concentration of a gas of interest emitted transcutaneously, this gas of interest possibly for example being carbon dioxide. The flow of gas through the device allows optimized collection of the gas of interest. Moreover, the device may use an optical gas-of-interest sensor the measured signals of which are optimally processed.

SUMMARY OF THE INVENTION

A first subject of the invention is a measuring device, intended to be placed on the skin of a user, the user being a human being or an animal, the device extending between a contact face, intended to be applied against the skin of the user, and a far end, the device comprising a side wall that extends between the contact face and the far end, the device comprising:

on the contact face, at least one aperture that is configured to collect a transcutaneous gas of interest emitted through the skin, the aperture being produced through the contact face;

a collecting chamber that extends between the contact face and a measuring chamber;

a gas sensor, placed in the measuring chamber, and configured to measure a concentration of gas of interest flowing through the measuring chamber;

a processing and computing unit, configured to estimate a gas-of-interest content in the body of the user on the basis of the measurement taken by the gas sensor;

a heat source, configured to bring the contact face to a temperature above 37° C.; the device being characterized in that it comprises:

an aperture that forms an air intake, said aperture being produced through the side wall and configured to admit ambient air into the collecting chamber;

such that, under the effect of the temperature produced by the heat source, a convection current of air is generated, the air admitted into the collecting chamber through the side wall entraining the transcutaneous gas of interest to the measuring chamber, the air and the transcutaneous gas of interest forming a gas mixture extending into the measuring chamber.

The gas of interest may notably be carbon dioxide.

The device may comprise a humidity sensor for determining a humidity level in the measuring chamber, the processing and computing unit being configured to take into account the humidity level in the measuring chamber to estimate a concentration of gas of interest in the measuring chamber.

The device may comprise a pressure sensor, to determine a pressure in the measuring chamber, the processing and computing unit being configured to take into account the pressure in the measuring chamber to estimate a partial pressure of gas of interest in the collecting chamber.

Preferably, the gas sensor is an optical sensor that comprises an infrared radiation source and a photodetector, the infrared radiation source and the photodetector being arranged such that the gas mixture flows, in the measuring chamber, between the infrared radiation source and the photodetector, the photodetector comprising two measurement channels configured to respectively measure infrared radiation, emitted by the infrared radiation source, and having propagated through the measuring chamber in:

a measurement spectral band that corresponds to an absorption spectral band of the gas of interest;

a reference spectral band, considered as not absorbed by the gas of interest. The device may comprise:

an auxiliary measuring chamber, configured to be occupied by the ambient air extending around the device;

an auxiliary gas-of-interest sensor, placed in the auxiliary measuring chamber, and configured to measure a concentration of gas of interest in the ambient air occupying the auxiliary measuring chamber;

the processing and computing unit being configured to take into account the measurement of the auxiliary sensor to estimate the gas-of-interest content in the body of the user.

Preferably, the auxiliary gas-of-interest sensor is an optical sensor that comprises an auxiliary infrared radiation source and an auxiliary photodetector, the auxiliary infrared radiation source and the auxiliary photodetector being arranged such that ambient air extends, in the auxiliary measuring chamber, between the auxiliary infrared radiation source and the auxiliary photodetector, the auxiliary photodetector comprising two measurement channels configured to respectively measure infrared radiation, emitted by the auxiliary infrared radiation source, and having propagated through the auxiliary measuring chamber in:
- a measurement spectral band that corresponds to an absorption spectral band of the gas of interest;
- a reference spectral band ($\lambda_2$), considered as not absorbed by the gas of interest.

The device may comprise:
- a sensor of ambient air pressure, the ambient air extending around the device;
- and/or a sensor of ambient air temperature;
- and/or a sensor of pressure in the collecting chamber;
- and/or a sensor of temperature in the collecting chamber;
- and/or a temperature sensor, configured to measure a skin temperature;
- and/or a sensor of temperature in the measuring chamber;
- and/or a humidity sensor, placed in the auxiliary measuring chamber;
- and/or a pressure sensor, in the auxiliary measuring chamber;
- and/or a temperature sensor, in the auxiliary measuring chamber.

The device may also comprise:
- a humidity sensor configured to measure the humidity of the ambient air extending around the device;
- a temperature sensor configured to measure the temperature of the ambient air extending around the device;
- a pressure sensor configured to measure the pressure of the ambient air extending around the device.

A second subject of the invention is a method for estimating a gas-of-interest content in the blood of a user, using a device according to the first subject of the invention, the device being applied such that the contact face is placed facing the skin of the user, the method comprising heating the contact face and admitting ambient air through the side wall of the device, the method comprising:
- a) an estimation of a concentration of gas of interest in the measuring chamber;
- b) on the basis of the concentration of gas of interest resulting from step a), computing a partial pressure of gas of interest in the collecting chamber;
- c) on the basis of the partial pressure of gas of interest in the collecting chamber, resulting from step b), estimating a partial pressure of gas of interest dissolved in the blood of the user.

Step c) may comprise the sub-steps:
- (i) on the basis of the partial pressure of gas of interest in the collecting chamber, resulting from step b), estimating a partial pressure of transcutaneous gas of interest having diffused through the skin of the user;
- (ii) on the basis of the partial pressure of transcutaneous gas of interest resulting from sub-step (i), estimating a partial pressure of gas of interest dissolved in the blood of the user.

The method may comprise measuring a concentration of gas of interest in the ambient air, the concentration thus measured being taken into account in step c).

The method may comprise measuring an ambient air pressure, the ambient air pressure being taken into account in step c).

According to one embodiment, step a) is implemented using a gas sensor, placed in the measuring chamber, and formed by an infrared radiation source and by a photodetector comprising two measurement channels configured to respectively measure infrared radiation, emitted by the infrared radiation source, and having propagated through the measuring chamber in:
- a measurement spectral band that corresponds to an absorption spectral band of the gas of interest;
- a reference spectral band, considered as not absorbed by the gas of interest.

Step a) may then comprise:
- a comparison of signals respectively generated by the two measurement channels;
- solving a second-degree polynomial, this implementing the comparison and predetermined parameters, so as to estimate the concentration of gas of interest in the measuring chamber.

The root of the polynomial may be a non-integer power of the concentration of gas of interest in the measuring chamber. The parameters of the second-degree polynomial may be defined in a supervised calibrating phase, using calibration samples having a known concentration of gas of interest.

Step a) may comprise measuring a water-vapor content in the measuring chamber, the water-vapor content being taken into account in the estimation of the concentration of gas of interest in the measuring chamber.

The method may comprise measuring the temperature in the measuring chamber and in the collecting chamber, step b) comprising taking into account the temperatures thus measured.

The method may comprise measuring the pressure in the measuring chamber and in the collecting chamber, step b) comprising taking into account the pressures thus measured.

The gas of interest may be carbon dioxide.

The measurement spectral band may be variable, so as to address various gases of interest.

A third subject of the invention is a method for estimating a concentration of a gas of interest in a gas, the gas of interest having an absorption spectral band, the gas occupying a measuring chamber, the measuring chamber comprising an infrared radiation source and a photodetector, the photodetector comprising:
- a first channel, intended to measure infrared radiation having propagated through the gas, and to generate a first signal representative of an amount of light detected in the absorption spectral band;
- a second channel, intended to measure infrared radiation having propagated through the gas, and to generate a second signal representative of an amount of light detected in a reference spectral band, in which the absorption of the infrared radiation by the gas of interest is considered to be negligible;

the method being characterized in that it comprises:
- a comparison of the signals respectively generated by the two measurement channels;
- solving a second-degree polynomial, this implementing the comparison and predefined parameters, so as to estimate the concentration of gas of interest in the measuring chamber.

One of the roots of the polynomial is then a power, notably a non-integer power, of the concentration of the analyzed gas species. To compute the concentration it may be necessary to compute the root of the second-degree polynomial defined as the power to an exponent equal to the inverse of this non-integer power.

The parameters of the second-degree polynomial are preferably defined in a supervised calibrating phase, using calibration samples having a known concentration of the analyzed gas of interest.

The method may comprise measuring a water-vapor content in the measuring chamber, the water-vapor content being taken into account in the estimation of the concentration of analyzed gas of interest.

The gas of interest may notably be carbon dioxide. The gas may contain air.

FIGURES

Figure 3A:
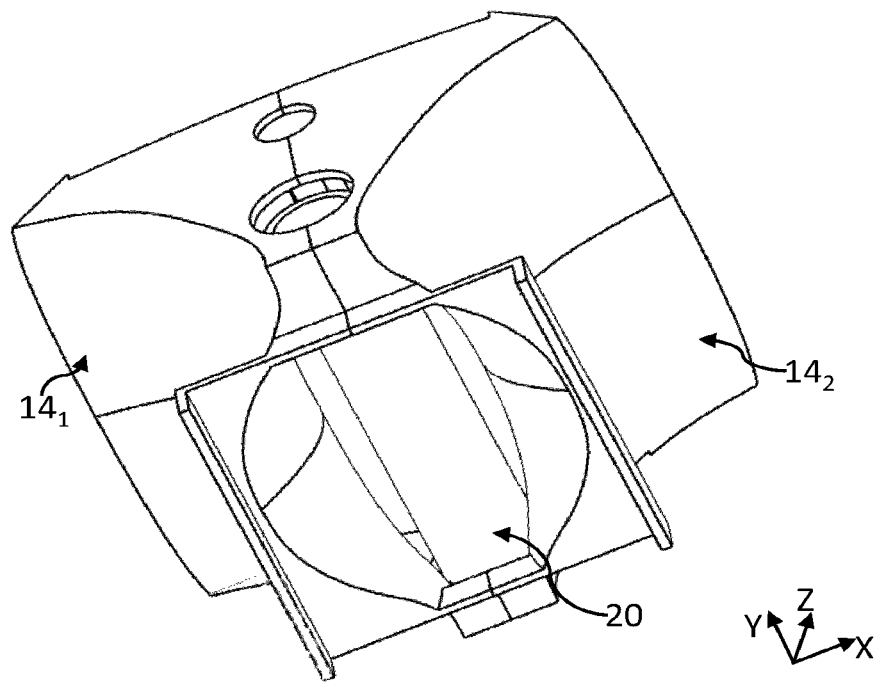
Figure 3B:
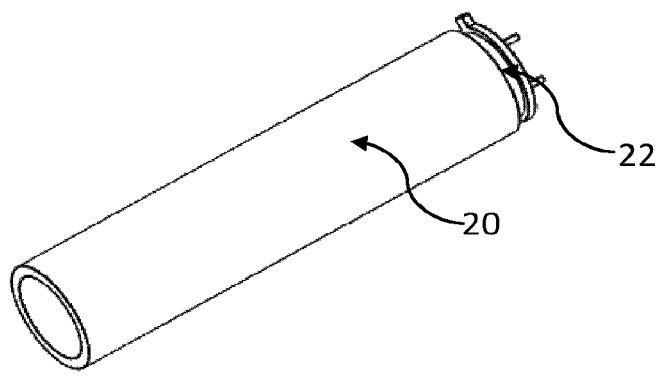

FIGS. 3A and 3B schematically show the location of the measuring chamber and the measuring chamber, respectively.

Figure 3C:
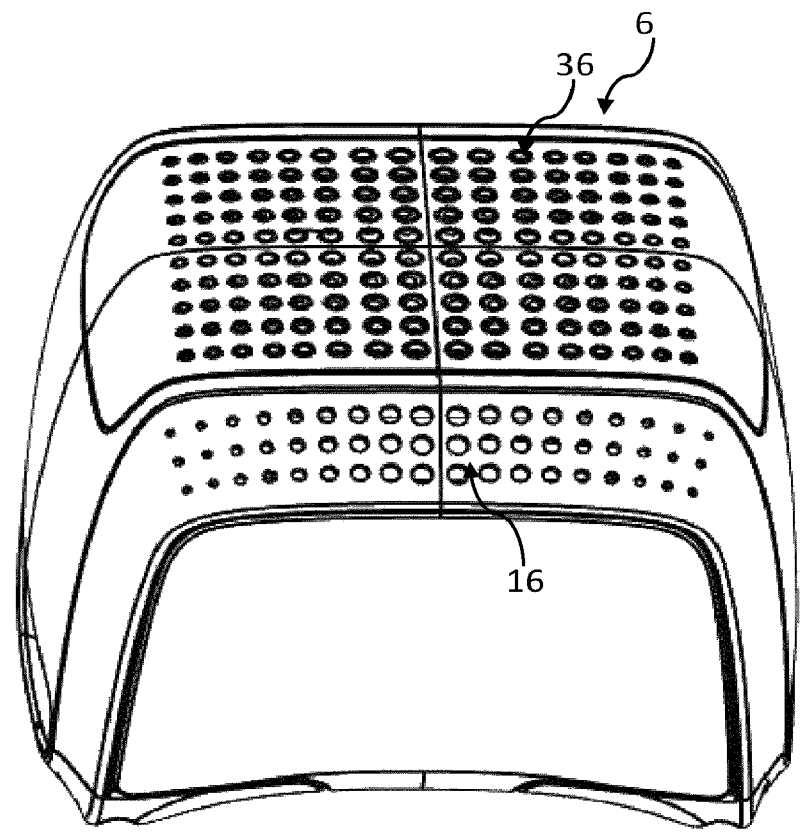

FIG. 3C shows a detail of the far end of the device.

Figure 4:
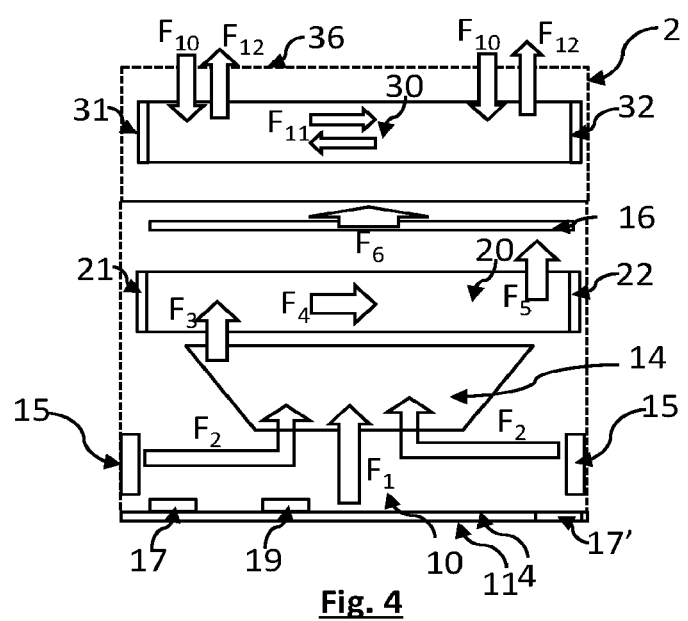

FIG. 4 illustrates the gas flows through the device.

FIG. 5 shows the main steps of a method implementing the device.

FIGS. 6A and 6B show a measuring chamber and an auxiliary measuring chamber, respectively.

Figure 7A:
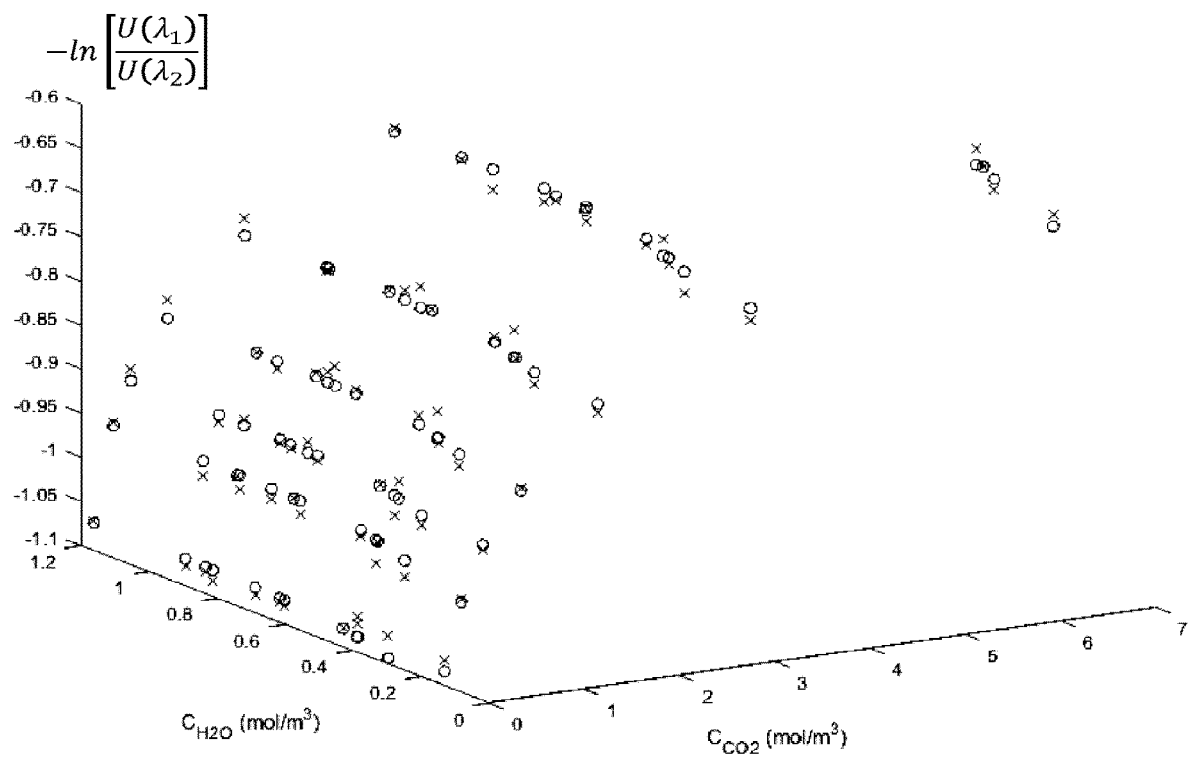
Figure 7B:
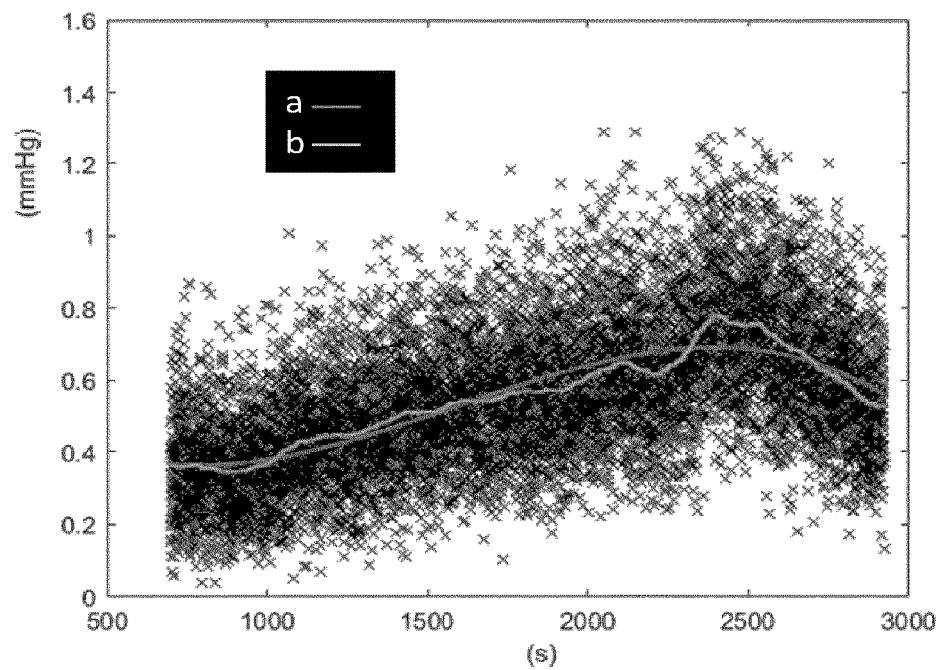

FIGS. 7A and 7B show obtained experimental results.

DESCRIPTION OF PARTICULAR EMBODIMENTS

Figure 1A:
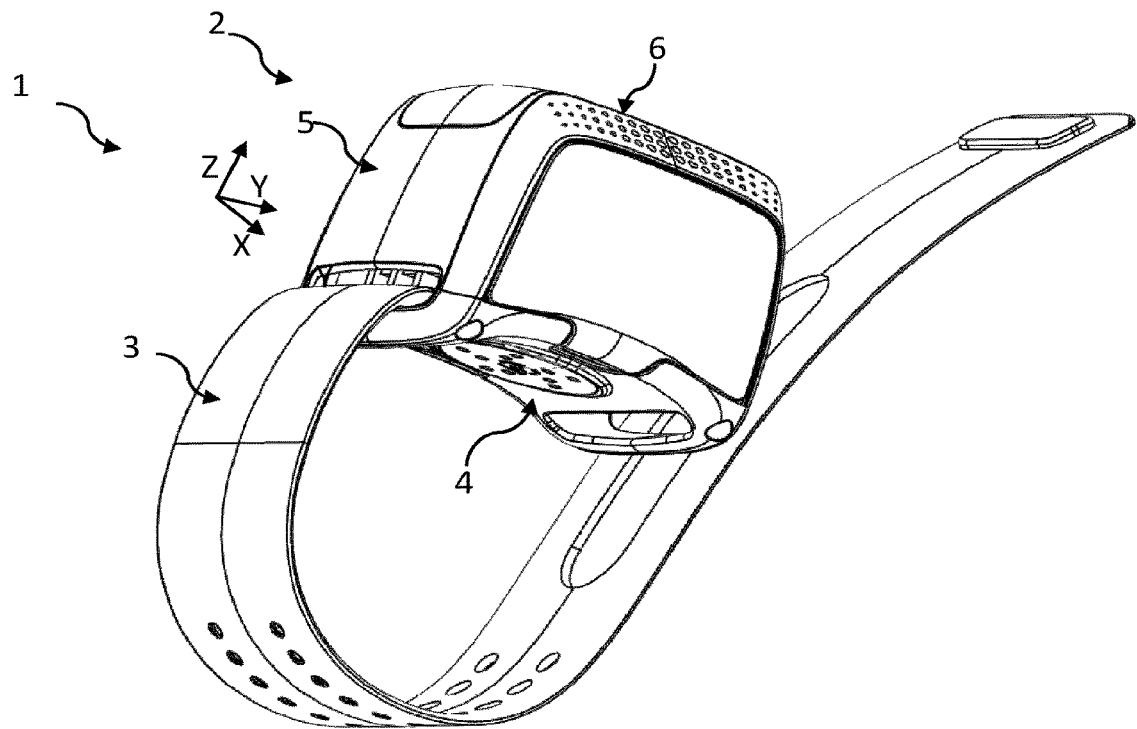
FIGS. 1A and 1B are overviews of the device.
Figure 1B:
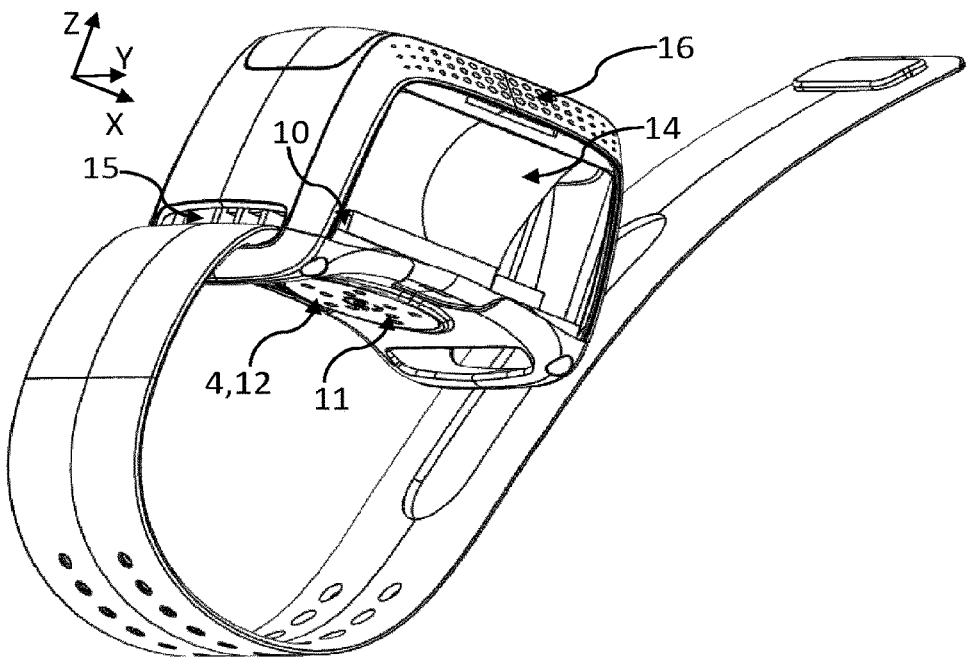

FIGS. 1A and 1B are general views of one example of a device 1 according to the invention. The device 1 is intended to be placed in contact with the skin of a human or animal user, or at a small distance from its skin, and typically at a distance smaller than 1 cm. It comprises a main body 2 and a fastening element 3, the latter being, in this example, a strap. The main body 2 comprises a contact face 4, intended to be placed on the skin. The contact face is substantially planar, in the sense that it lies parallel to an XY plane, certain segments possibly being inclined with respect to the XY plane. The main body also comprises a far end 6, opposite the contact face 4, and substantially parallel to the latter. The contact surface 4 and the far end 6 are connected to each other by a lateral face 5 that lies about a transverse axis Z that is perpendicular to the XY plane.

Figure 2A:
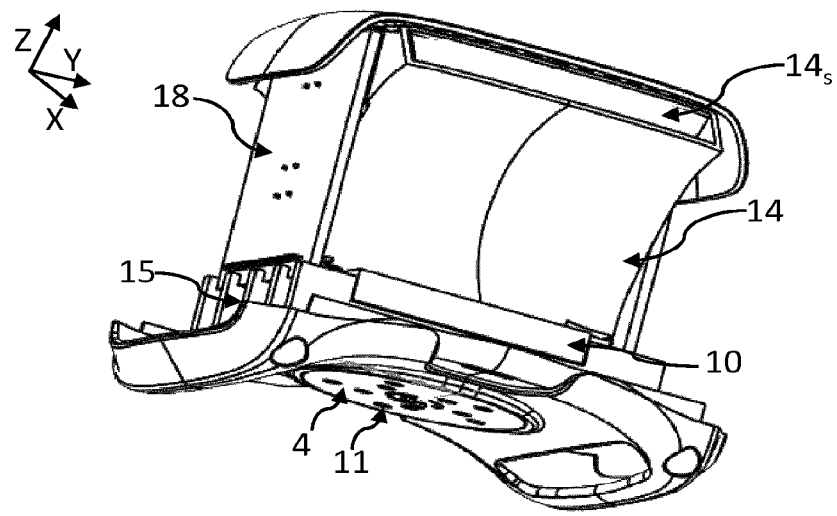
FIGS. 2A and 2B show the main elements of the device.

As shown in FIG. 1B, the contact face 4 bounds a collecting chamber 10. The latter is, in this example, bounded by a plate that forms part of the contact face 4, and in which through-apertures 11 are formed. The device also comprises a heating element 12 that allows the contact face 4 that bounds the collecting chamber 10 to be brought to a temperature above 37° C., and preferably comprised between 40° C. and 50° C., and preferably between 40° C. and 45° C., 42° C. for example. The heating element 12 is for example a resistor that is arranged on the plate bounding the collecting chamber 10, and that generates heat via Joule heating. Specifically, a local and moderate increase in temperature, in the vicinity of the skin, promotes a dilation of the blood capillaries, this increasing the diffusion of a transcutaneous gas of interest, through the skin. By gas of interest, what is meant is a gas a concentration of which in a living animal or human body, and more particularly in the blood, is to be determined. In the example described below, non-limitingly, the gas of interest is carbon dioxide, a content of which in the blood of the user it is sought to estimate. Inside the main body 2, FIG. 2A shows a duct 14, intended to guide the transcutaneous $CO_2$ collected by the collecting chamber 10 to a measuring chamber 20, then downstream of the latter, to outlets $14_s$, as described below.

Figure 2B:
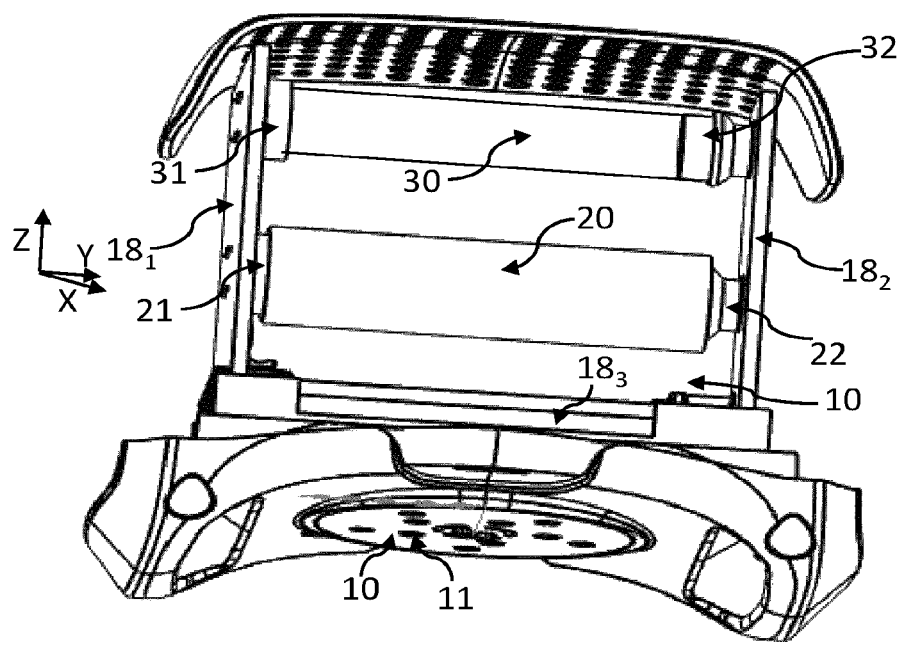

In order to facilitate the transport of transcutaneous $CO_2$ to the measuring chamber 20, the main body 2 comprises apertures 15, intended to admit ambient air. Ambient air designates the air extending around the device 1. In the example shown in FIG. 2B, the apertures 15 are produced through the lateral face 5. Under the effect of the heat given off in the collecting chamber 10 under the action of the heating element 12, a thermal convection current is formed. Therefore, the transcutaneous $CO_2$ and ambient air admitted into the main body form a gas mixture that moves away from the contact face 4 and propagates toward the measuring chamber 20, in the direction of the end 6. Thus, the ambient air admitted into the main body 2 through the apertures 15 acts as a carrier gas and transports the transcutaneous $CO_2$ through the main body, and notably through the collecting chamber 10, to the measuring chamber 20. The lateral apertures, and the heating applied in the collecting chamber, form a chimney effect, which acts as a "motor" allowing a propagation of $CO_2$ through the main body 2 of the device, via convection.

The measuring chamber 20 is, in this example, placed substantially parallel to the contact face 4. The function of the measuring chamber is to estimate a $CO_2$ concentration of the gas mixture flowing through the main body 2. To this end, the measuring chamber 20 comprises a gas sensor 23. A plurality of types of sensors may be used to this end, for example optical sensors or electrochemical sensors, the latter notably being able to be based on metal oxides (MOX sensors). The inventors have estimated that it is preferable to use an optical sensor, and more precisely an infrared sensor. Such a sensor does not require any particular maintenance, and is particularly compact, and inexpensive. In addition, such a sensor is very specific with respect to characterization of chemical bonds. It is suitable for detecting small molecules, carbon dioxide for example. Gas sensors based on absorption of infrared light are known, and are usually designated by the term NDIR sensors (NDIR being the acronym of non-dispersive infrared). This type of sensor comprises an infrared radiation source 21 that generally emits in a spectral band comprised between 1 μm and 20 μm. It also comprises a photodetector 22 that is sensitive to the infrared radiation. The principle is based on the attenuation, by the analyzed gas, of the infrared radiation emitted by the source. The infrared source 21 and the photodetector 22 form the gas sensor 23, the operating principle of which is described in detail with reference to FIGS. 6A and 6B. The photodetector 22 is for example a thermopile.

The device preferably comprises an auxiliary measuring chamber 30. The auxiliary measuring chamber 30 comprises an auxiliary $CO_2$ sensor 33 that operates in the same way as the sensor 23 placed in the measuring chamber 20. It comprises an infrared radiation source 31 and a photodetector 32. The auxiliary sensor 33 is intended to estimate a concentration of $CO_2$ in the ambient air surrounding the main body 2. The use of such a sensor is preferable, but not essential.

The device comprises circuit boards $18_1$, $18_2$, $18_3$. All of the circuit boards form a processing and computing unit 18, configured to drive the various electronic components of the device, and to process the data output by the various detectors. The processing and computing unit may comprise computing means, a microprocessor for example, integrated into the device or located remotely from the latter and connected thereto by a wired or wireless link. The processing and computing unit is also configured to implement the method for estimating the $CO_2$ content dissolved in the blood of the user, the main steps of which are schematically shown in FIG. 5. For this purpose, the processing unit may comprise one or more microprocessors.

FIG. 3A shows the duct 14, which allows the gas mixture to be directed to the measuring chamber 20. Downstream of the measuring chamber 20, the gas mixture is delivered to exhaust apertures 16, which are shown in FIG. 3C. More precisely, the duct 14 is divided into two elementary ducts $14_1$ and $14_2$, which open onto the exhaust apertures 16 placed downstream of the outlets $14_s$. FIG. 3B shows the measuring chamber 20, which especially comprises the photodetector 22.

At the far end 6, apertures 36 are produced that allow ambient air to gain access to an auxiliary measuring chamber 30. The auxiliary measuring chamber 30 is isolated from the rest of the components of the main body, such that it is exposed only to the ambient air extending around the main body 2. The auxiliary measuring chamber does not receive transcutaneous $CO_2$. The auxiliary measuring chamber 30 is optional. It allows the precision with which the partial pressure of transcutaneous $CO_2$ in the gas mixture flowing through the measuring chamber 20 may be estimated to be refined.

FIG. 4 schematically shows the fluidic currents formed in the device. Transcutaneous $CO_2$ is admitted into the device through the through-apertures 11 formed in the contact face 4, which through-apertures open into the collecting chamber 10 (see arrow $F_1$). Ambient air is admitted through the apertures 15 formed in the side wall 5 (see arrows $F_2$). The gas mixture comprising the ambient air and transcutaneous $CO_2$ propagates to the measuring chamber 20 (see arrow $F_3$), through the duct 14. The gas mixture then extends into the measuring chamber 20, between the infrared radiation source 21 and the photodetector 22 (see arrow $F_4$), before leaving the main body 2 (see arrows $F_5$ and $F_6$).

In parallel to this flow, ambient air diffuses into the auxiliary measuring chamber 30 through the apertures 36 (arrows $F_{10}$), and extends, by diffusion, through the auxiliary measuring chamber (arrows $F_{11}$ and arrows $F_{12}$).

The processing and computing unit 18 collects the measurements of the partial pressure of $CO_2$ in the measuring chamber 20 and in the auxiliary measuring chamber 30. On the basis of these measurements, the partial pressure of transcutaneous $CO_2$, and the partial pressure of $CO_2$ in the blood, are successively estimated, via the steps schematically shown in FIG. 5.

Step 100: determining the concentration of $CO_2$ in the measuring chamber 20. Measurement of the partial pressure of $CO_2$ in the measuring chamber 20 is a particularly important step. FIG. 6A schematically shows the measuring chamber 20. It defines a measurement volume that extends between an infrared radiation source 21 and the photodetector 22. The source and detector are components of the $CO_2$ sensor 23.

The photodetector 22 comprises a measurement channel $22_1$ and a reference channel $22_2$. The measurement channel $22_1$ is configured to detect radiation having propagated through the measuring chamber 20, in an absorption spectral band that corresponds to the gas species that it is desired to analyze, in the present case $CO_2$. Thus, the measurement channel $22_1$ performs a measurement of the intensity of the radiation transmitted by the gas mixture in a detection spectral band centered on $\lambda_1=4.26$ µm. The reference channel $22_2$ is configured to detect radiation having propagated through the measuring chamber 20 in a reference spectral band, in which the absorption by the gas mixture is considered to be negligible. The reference spectral band is for example centered on $\lambda_2=3.91$ µm. It will be noted that at the detection wavelength $\lambda_1$ and at the reference wavelength $\lambda_2$, the absorption of the radiation by water vapor may be considered to be equal. Otherwise, moisture concentration is taken into account in the model, as described below. The same goes for the absorption of air, which may be considered to be equal at the two wavelengths.

The measuring chamber 20 comprises, preferably, a temperature sensor 24, a humidity sensor 25, and a pressure sensor 26. The auxiliary measuring chamber 30 comprises, preferably, an auxiliary temperature sensor 34, an auxiliary humidity sensor 35, and an auxiliary pressure sensor 36.

Let $U_0(\lambda_1)$ and $U(\lambda_1)$ be the voltages measured across the terminals of the measurement channel $22_1$, in the absence of gas from and in the presence of gas in the measuring chamber 20, respectively. Let $U_0(\lambda_2)$ and $U(\lambda_2)$ be the voltages measured across the terminals of the measurement channel $22_2$, in the absence of gas from and in the presence of gas in the measuring chamber 20, respectively. If $C_{CO2}$ is the molar concentration of $CO_2$ in the gas mixture, it may be shown that:

$$-\ln\left[\frac{\frac{U(\lambda_1)}{U(\lambda_2)}}{\frac{U_0(\lambda_1)}{U_0(\lambda_2)}}\right] = [k_{CO2}(\lambda_1) - k_{CO2}(\lambda_2)] \quad (1)$$

$$C_{CO2} + [k_{H2O}(\lambda_1) - k_{H2O}(\lambda_2)]C_{H2O} + [A_{air}(\lambda_1) - A_{air}(\lambda_2)]$$

where:
$k_{CO2}$ is the attenuation coefficient of $CO_2$;
$k_{H2O}$ is the attenuation coefficient of water, i.e. $H_2O$, vapor;
$A_{air}$ is the attenuation of air;
$C_{H2O}$ is the molar concentration of $H_2O$ (water vapor) in the gas mixture.

However, it may be considered that $A_{air}(\lambda_1)=A_{air}(\lambda_2)$ et $k_{H2O}(\lambda_1)=k_{H2O}(\lambda_2)$ and that $k_{CO2}(\lambda_2)=0$.
Expression (1) then becomes:

$$-\ln\left[\frac{\frac{U(\lambda_1)}{U(\lambda_2)}}{\frac{U_0(\lambda_1)}{U_0(\lambda_2)}}\right] \approx k_{CO2}(\lambda_1)C_{CO2} \quad (2)$$

Thus, to a first approximation, the concentration of $CO_2$ in the measuring chamber 20 may be estimated via a comparison, taking the form of a ratio, between the signals $U(\lambda_1)$ and $U(\lambda_2)$ generated by the measurement photodetector and the reference photodetector, respectively, the ratio $$\frac{U_0(\lambda_1)}{U_0(\lambda_2)}$$

having been determined by calibration prior to use of the device, and being considered to remain constant during use of the device. Differential measurement is then spoken of, because the $CO_2$ concentration is estimated via a simple comparison of the signals $U(\lambda_1)$ and $U(\lambda_2)$. Expression (2) corresponds to the application of a linear model, the attenuation being considered to vary linearly as a function of $CO_2$ concentration.

However, such a model does not take into account a number of causes of uncertainty or variability, and in particular the fact that:

the concentration $C_{H2O}$ of water vapor in the gas mixture is much higher than the concentration of $CO_2$;

because of multiple reflections inside the measuring chamber, the distance traveled by the detected infrared radiation, between the infrared radiation source 21 and the photodetector 22, is subject to variability. Specifically, the internal walls of the measuring chamber are preferably reflective. Consequently, the distances traveled by the light rays emitted by the source through the enclosure are variable. Because of the variability in the optical paths traveled through the gas, the attenuation lies in a range of variation. FIG. 6A shows various optical paths, schematically represented by dashed arrows. The linear model such as described with reference to expression (2) does not take into account such a variability in the optical paths.

the detection spectral band is not perfectly monochromatic, but extends over a certain spectral range $\Delta\lambda_1$ about the detection wavelength $\lambda_1$. However, in the addressed spectral range, the attenuation coefficients of $CO_2$, $k_{CO2}$ and of water vapor, $k_{H2O}$ vary.

These imperfections form sources of non-linearity. For this reason the inventors consider that the linear model, such as described by expressions (1) and (2), may be improved. They propose to model the measurements taken by the photodetectors with a quadratic linear model dependent on a non-integer power of the concentration of the gases. According to such a model, the measurements carried out by the detection and reference photodetectors are modeled by the following expression:

$$-\ln\left[\frac{\frac{U(\lambda_1)}{U(\lambda_2)}}{\frac{U_0(\lambda_1)}{U_0(\lambda_2)}}\right] = m_1 C_{CO2}^{u_1} + n_1 C_{CO2}^{2u_1} + m_2 C_{H2O}^{u_2} + n_2 C_{H2O}^{2u_2} + q C_{CO2}^{u_1} \cdot C_{H2O}^{u_2} \quad (3)$$

where:

$C_{CO2}$, and $C_{H2O}$ are the concentrations of $CO_2$ and $H_2O$ in the gas mixture, in the measuring chamber 20; $C_{H2O}$ may be obtained by implementing a humidity sensor 25 in the measuring chamber 20;

$m_1$, $n_1$, $m_2$, $n_2$, and $q$ are scalar parameters of the model;

$u_1$, $u_2$ are real numbers, which may be non-integers, corresponding to the powers of the concentrations;

the ratio $U_0(\lambda_1)/U_0(\lambda_2)$ is determined by calibration prior to use of the device.

The bilinear term $C_{CO2}^{u_1} \cdot C_{H2O}^{u_2}$ may be neglected, in which case $q=0$.

Taking into account such a model has the advantage that it may be inverted analytically in a simple way, without requiring powerful computing means.

The concentration $C_{H2O}$ is determined by way of the humidity sensor 25. It is therefore a quantity that is considered to be known.

By making the following changes of variables:

$$\gamma = m_2 C_{H2O}^{u_2} + n_2 C_{H2O}^{2u_2} + \ln\left[\frac{\frac{U(\lambda_1)}{U(\lambda_2)}}{\frac{U_0(\lambda_1)}{U_0(\lambda_2)}}\right] \quad (4)$$

$$\beta = q C_{H2O}^{u_2} + m_1 \quad (5)$$

$$x = C_{CO2}^{u_1} \quad (6)$$

Expression (3) may be written:

$$n_1 x^2 + \beta x + \gamma = 0 \quad (7)$$

It is a polynomial of the second degree, the solutions of which are:

$$x = \frac{-\beta \pm \sqrt{\beta^2 - 4 n_1 \gamma}}{2 n_1} \quad (8)$$

$$\text{and } C_{CO2} = \sqrt[u_1]{x} \quad (9)$$

Equation (8) gives two possible values of x, only one of which, generally the lowest, allows a $C_{CO2}$ concentration comprised in a predetermined range of values to be obtained. The predetermined range of values corresponds to values that are to be expected given the targeted application.

Use of the humidity sensor 25 is preferable, but not essential. According to one simplified model, the measurements may be modeled by:

$$-\ln\left[\frac{\frac{U(\lambda_1)}{U(\lambda_2)}}{\frac{U_0(\lambda_1)}{U_0(\lambda_2)}}\right] = m_1 C_{CO2}^{u_1} + n_1 C_{CO2}^{2u_1} \quad (3')$$

By making the changes of variables:

$$\gamma = \ln\left[\frac{\frac{U(\lambda_1)}{U(\lambda_2)}}{\frac{U_0(\lambda_1)}{U_0(\lambda_2)}}\right] \quad (4')$$

$$\beta = m_1 \quad (5')$$

$$x = C_{CO2}^{u_1} \quad (6')$$

Expression (3) may be written:

$$n_1 x^2 + \beta x + \gamma = 0 \quad (7')$$

It is a polynomial of the second degree, the solutions of which are:

$$x = \frac{-\beta \pm \sqrt{\beta^2 - 4 n_1 \gamma}}{2 n_1} \quad (8')$$

It will be noted that such a model may be used to measure $CO_2$, or any other gas species an absorption spectral band of which is known, independently of the device and application described in this patent application. Thus, such a model may be used to process measurements based on the attenuation of infrared radiation by a gas species, the measurements being taken both in the absorption spectral band of the gas species in question, and in a reference spectral band in which the absorption of the radiation is considered to be negligible.

Step 110 Determining the partial pressure of $CO_2$ in the measuring chamber 20.

Having determined the molar concentration $C_{CO2}$, the partial pressure of $CO_2$ in the measuring chamber 20 is determined by applying the ideal gas law:

$$P_{CO2}^{20} = C_{CO2} R T^{20} \quad (10)$$

where:
- $T^{20}$ corresponds to the temperature in the measuring chamber 20, measured using the temperature sensor 24;
- $P_{CO2}^{20}$ is the partial pressure of $CO_2$ in the measuring chamber 20;
- R is the ideal gas constant.

Step 120. Determining the partial pressure of $CO_2$ in the collecting chamber 10. On the basis of the partial pressure of $CO_2$ in the measuring chamber 20, the partial pressure of $CO_2$ in the collecting chamber 10 is determined. To do this, the following expression is used, this expression relating the total pressure measured in the measuring chamber 20, which is denoted $P_{Total}^{20}$, to the total pressure measured in the collecting chamber 10, which is denoted $P_{Total}^{10}$.

$$P_{CO2}^{10} = \frac{P_{Total}^{col}}{P_{Total}^{20}} P_{CO2}^{20} \tag{11}$$

where:
- $P_{Total}^{20}$ is the total pressure measured in the measuring chamber 20 by the pressure sensor 26.
- $P_{Total}^{col}$ is the total pressure measured in the collecting chamber 10 by a pressure sensor 19 placed in the collecting chamber 10, as shown in FIG. 4.

Step 130 Determining Transcutaneous $CO_2$ Pressure.

This step aims to determine the transcutaneous $CO_2$ pressure on the basis of the partial pressure of $CO_2$ in the collecting chamber 10. The arrival of air through the lateral apertures 15 must be taken into account. The collecting chamber 10 comprises a temperature sensor 17. The device also comprise an ambient-temperature sensor 34. When the device comprises an auxiliary measuring chamber 30, the ambient-temperature sensor is preferably placed in the latter.

According to a first approach, the $CO_2$ in the ambient air admitted through the lateral apertures 15 is neglected. It is thus assumed that the $CO_2$ flowing through the device is very predominantly transcutaneous $CO_2$.

According to this first approach, the transcutaneous $CO_2$ pressure $P_{CO_2}^{tc}$ in the collecting chamber 10 is:

$$P_{CO_2}^{tc}(T^{tc}) = \frac{T^{tc}}{T^{10}} \cdot g_{CO_2}^{tc/col} \cdot P_{CO_2}^{col}(T^{10}) \tag{12}$$

where:
- $P_{CO_2}^{tc}(T^{tc})$ is the transcutaneous $CO_2$ pressure at the transcutaneous temperature $T^{tc}$, i.e. the skin temperature, and expressed in mmHg. This temperature may be measured by a temperature sensor 17', as described below.
- $P_{CO_2}^{col}(T^{10})$ is the $CO_2$ pressure measured at the temperature $T^{10}$ in the collecting chamber and expressed in mmHg;
- $T^{10}$ is a temperature measured in the collecting chamber by a temperature sensor 17.

The notation $X(T^x)$ denotes the fact that a quantity X is measured at the temperature $T^x$.

The skin temperature $T^{tc}$ may be assumed to be known or be measured by a skin-temperature sensor 17', allowing the temperature of the skin to be known. The skin-temperature sensor may also allow heating of the skin with respect to a setpoint temperature, the latter being 42° C., to be regulated. $g_{CO_2}^{tc/col}$ is a correction factor allowing a dilution, in the collecting chamber 10, induced by the air admitted through the apertures 15 to be taken into account. This factor may be determined via the following expression:

$$g_{CO_2}^{tc/col} = \frac{k_{blood} \cdot \rho_{skin}^{blood} \cdot S_{skin} \cdot H_{b:air} + D_{air}}{k_{blood} \cdot \rho_{skin}^{blood} \cdot S_{skin} \cdot H_{b:air}} \tag{13}$$

$k_{blood}$ is a coefficient of mass transfer, expressed in m·s$^{-1}$, between blood and air;
$S_{blood}$ is the area of exchange at the blood/air interface
$\rho_{skin}^{blood}$ is a ratio of blood perfusion to the surface of the skin:

$$\rho_{skin}^{blood} = \frac{S_{blood}}{S_{skin}} \tag{14}$$

$S_{blood}$ is the area of blood involved in the emission of transcutaneous $CO_2$;
$S_{skin}$ is the area of the skin involved in the emission of transcutaneous $CO_2$: it is a question of the area of skin placed facing the device;
$H_{b:air}$ is a blood/air partition coefficient also corresponding to a Henry's law constant between a liquid concentration and a gas concentration;
$D_{air}$ is the volumetric flow rate of air through the device (m³/s), through the lateral apertures 15—it is established as described below:

The coefficient of blood/air mass transfer and the blood/air partition coefficient are physiological quantities given in the literature: For example, the coefficient of mass transfer $k_{blood}$ may be considered to be equal to 23.1 μm/s. The blood/air partition coefficient $H_{b:air}$ may be, for example, considered to be equal to 0.59 at the temperature of 37° C. The ratio $\rho_{skin}^{blood}$ is adjusted depending on the bodily region to which the device 1 is applied.

The area $S_{skin}$ of the skin placed facing the device is defined by the geometry of the device.

This equation may be written:

$$g_{CO_2}^{tc/col} = 1 + \frac{D_{air}}{D_{CO_2}^{b:air}} \tag{16}$$

where
$D_{CO_2}^{b:air}$ is the rate of diffusion of $CO_2$ through the blood/air interface. It may be established using the following expression:

$$D_{CO_2}^{b:air} = \rho_{skin}^{blood} \cdot S_{skin} \cdot k_{blood} \cdot H_{b:air} \tag{17}$$

and $$D_{air}(T^{10}) = R \cdot T^{10} \frac{\left(P_{air}^{out\ col}(T^{10}) - P_{air}^{amb}(T^{amb})\right)}{P_{air}^{out\ col}(T^{10}) \cdot R^{col-amb}} \tag{18}$$

$P_{air}^{out\ col}$ is the air pressure measured in the collecting chamber 10;
$P_{air}^{amb}$ is the ambient air pressure, measured for example in the auxiliary chamber 30;
$R^{col-amb}$ is the Hagen-Poiseuille flow resistance between the collecting chamber and the ambient air;
R is the ideal gas constant.

The Hagen-Poiseuille flow resistance $R^{col-amb}$ may be estimated by making air flow at a set flow rate through the device on a testbed, and by measuring the pressures $P_{air}^{out\,col}(T^{10})$ and $P_{air}^{amb}(T^{amb})$ using the pressure sensors of the device. Then:

$$R^{col-amb} = R \cdot T^{10} \frac{\left(P_{air}^{out\,col}(T^{10}) - P_{air}^{amb}(T^{amb})\right)}{P_{air}^{out\,col}(T^{10}) \cdot D_{air}(T^{10})} \quad (19)$$

It may be shown that:

$$[CO_2^{tc}](T^{tc}) \cong g_{CO_2}^{tc/col} \cdot [CO_2^{10}](T^{10}) = g_{CO_2}^{tc/col} \cdot [CO_2^{20}](T^{20}) \quad (20)$$

[$CO_2^{tc}$] is the relative concentration of transcutaneous $CO_2$ in the collecting chamber 10, expressed in ppm;
[$CO_2^{10}$] is the total concentration of $CO_2$ in the collecting chamber 10, expressed in ppm;
[$CO_2^{20}$] is the concentration of $CO_2$ in the measuring chamber 20;
[$CO_2^{amb}$] is the concentration of $CO_2$ in the ambient air, measured in the auxiliary chamber 30, and expressed in ppm.

According to a second approach, geometric effects and temperature variations in the ambient air are taken into account. The collecting chamber 10 comprises a temperature sensor 17. The device also comprises an ambient-temperature sensor 34. When the device comprises an auxiliary measuring chamber 30, the ambient-temperature sensor is preferably placed in the latter. According to this second approach, $$P_{CO_2}^{tc}(T^{tc}) = g_{CO_2}^{tc/col} \cdot \frac{P_{CO_2}^{out\,col}(T^{10})}{P_{air}^{out\,col}(T^{10})} \cdot P_{air}^{amb}(T^{amb}) \cdot \frac{T^{tc}}{T^{amb}} \cdot \sqrt{\frac{S^{15}}{S^{11}}} \quad (21)$$

$T^{amb}$ is the temperature of the ambient air. It is measured by a temperature sensor 34, the latter being able to be placed in the auxiliary measuring chamber 30 when the device is equipped with such a chamber;
$T^{tc}$ is the skin temperature, for example equal to 42° C.;
$T^{10}$ is the temperature in the collecting chamber, through which the transcutaneous $CO_2$ passes; it is measured by the temperature sensor 17.
$P_{air}^{amb}$ is the pressure of the ambient air. It is measured by a sensor 36 of ambient air pressure, said sensor being able to be placed in the auxiliary measuring chamber 30 when the device is equipped with such a chamber;
$S^{15}$ is the area of the lateral apertures 15, through which the ambient air is admitted into the collecting chamber 10;
$S^{11}$ is the area of the through-apertures 11, through which the transcutaneous $CO_2$ is admitted into the collecting chamber 10.

According to a third approach, the $CO_2$ concentration transported by the ambient air admitted into the collecting chamber 10 through the lateral apertures 15 is also taken into account. The $CO_2$ concentration may be predetermined, i.e. reflect a predefined concentration, for example an average $CO_2$ concentration in air. Advantageously, the concentration of $CO_2$ in the ambient air is measured using the auxiliary measuring chamber 30, which was mentioned above, or via another measuring method.

The auxiliary measuring chamber contains only ambient air. FIG. 6B schematically shows the auxiliary measuring chamber. The operation of the auxiliary measuring chamber 30 may be similar to the operation of the measuring chamber 20. In particular, the auxiliary infrared radiation source 31 emits radiation in an emission spectral band comprised between 1 μm and 20 μm. The auxiliary photodetector 32 comprises a measurement channel $32_1$ centered on 4.28 μm and a reference channel $32_2$ centered on 3.91 μm. The auxiliary measuring chamber allows measurements to be obtained that may be modeled with a non-linear model such as described with reference to step 100:

$$-\ln\left[\frac{\frac{U'(\lambda_1)}{U'(\lambda_2)}}{\frac{U'_0(\lambda_1)}{U'_0(\lambda_2)}}\right] = \quad (22)$$

$$m'_1 C_{CO_2}^{amb\,u'_1} + n'_1 C_{CO_2}^{amb\,2u'_1} + m'_2 C_{H2O}^{amb\,u'_2} + n'_2 C_{H2O}^{amb\,2u'_2} + q' C_{CO_2}^{amb\,u'_1} \cdot C_{H2O}^{amb\,u'_2}$$

where:
$C_{CO2}^{amb}$ is the concentration of $CO_2$ in the ambient air;
$C_{H2O}^{amb}$ is the concentration of $H_2O$ in the ambient air, said concentration possibly being measured by an auxiliary humidity sensor 35 placed in the auxiliary measuring chamber 30;
$U'_0(\lambda_1)$ and $U'(\lambda_1)$ are the signals, for example the voltages, measured across the terminals of the measurement channel $32_1$ in the absence of gas from and in the presence of gas in the auxiliary measuring chamber 30, respectively.
$U'_0(\lambda_2)$ and $U'(\lambda_2)$ are the signals, for example the voltages, measured across the terminals of the reference channel $32_2$ in the absence of gas from and in the presence of gas in the auxiliary measuring chamber 30, respectively.
$m'_1$, $n'_1$, $m'_2$, $n'_2$, and $q'$ are scalar parameters of the model corresponding to the auxiliary sensor 33;
$u'_1$, $u'_2$ are real numbers, which may be non-integers, corresponding to the powers of the concentrations.

The values $m'_1$, $n'_1$, $m'_2$, $n'_2$, $q'$, $u'_1$ and $u'_2$ may be determined in a calibrating phase, such as that described in step 90.

It is considered that the partial pressure of $CO_2$ in the blood is likely to be most accurately estimated when the concentration of $CO_2$ in the ambient air is taken into account.

According to this third approach, the contribution due to $CO_2$ in the ambient air having been admitted into the collecting chamber 10 through the lateral apertures is subtracted.

Thus:

$$[CO_2^{tc}](T^{tc}) = \quad (25)$$

$$g_{CO_2}^{tc/col} \cdot [CO_2^{10}](T^{10}) - \frac{D_{air}}{k_{blood} \cdot \rho_{skin}^{blood} \cdot S_{skin} \cdot H_{b:air}} \cdot \sqrt{\frac{S^{15}}{S^{11}}} \cdot [CO_2^{amb}](T^{amb})$$

However, $$[CO_2^{10}](T^{10}) = [CO_2^{20}](T^{20}) \quad (26)$$

Hence:

$$[CO_2^{tc}](T^{tc}) = g_{CO_2}^{tc/col} \cdot [CO_2^{20}](T^{20}) - \frac{D_{air}(T^{10})}{D_{CO_2}^{b:air}} \cdot \sqrt{\frac{S^{15}}{S^{11}}} \cdot [CO_2^{amb}](T^{amb}) \quad (27)$$

$D_{CO_2}^{b:air}$ is the volumetric flow rate of diffusion of $CO_2$ through the blood/air interface. If only the blood/air phase change is taken into account, we may use the expression:

$$D_{CO_2}^{b:air} = \rho_{skin}^{blood} \cdot S_{skin} \cdot k_{blood} \cdot H_{b:air} \qquad (28)$$

If we also want to take into account the effect of the skin on the diffusion of the gas, we may introduce the binary diffusion coefficient of the skin $D_{skin}^{bin}$ (m·s$^{-1}$). It defines the rate of diffusion of carbon dioxide through the skin.

In this case, the expression for $D_{CO_2}^{b:air}$ becomes:

$$D_{CO_2}^{b:air} = \rho_{skin}^{blood} \cdot S_{skin} \cdot K_{CO_2}^{blood\ to\ col} \qquad (29)$$

$K_{CO_2}^{blood\ to\ col}$ is the coefficient of total mass transfer between blood and air combining the phase change and the diffusion through the skin:

$$\frac{1}{K_{CO_2}^{blood\ to\ col}} = \frac{1}{k_{blood} H_{b:air}} + \frac{1}{D_{skin}^{bin}} \qquad (30)$$

$D_{air}(T^{10})$ is the volumetric flow rate of air admitted through the lateral apertures 15 into the collecting chamber 10, such that:

$$D_{air}(T^{10}) = R \cdot T^{10} \frac{(P_{air}^{out\ col}(T^{10}) - P_{air}^{amb}(T^{amb}))}{P_{air}^{out\ col}(T^{10}) \cdot R^{col-amb}} \qquad (31)$$

It is also possible to write:

$$[CO_2^{tc}](T^{tc}) = g_{CO_2}^{tc/col} \cdot [CO_2^{10}](T^{10}) - \frac{D_{air}(T^{10})}{D_{CO_2}^{skin}} \cdot \sqrt{\frac{S^{15}}{S^{11}}} \cdot [CO_2^{amb}](T^{amb}) \qquad (32)$$

However, $$[CO_2^{10}](T^{10}) = [CO_2^{20}](T^{20}) \qquad (33)$$

Hence $$[CO_2^{tc}](T^{tc}) = g_{CO_2}^{tc/col} \cdot [CO_2^{20}](T^{20}) - \frac{D_{air}(T^{10})}{D_{CO_2}^{skin}} \cdot \sqrt{\frac{S^{15}}{S^{11}}} \cdot [CO_2^{amb}](T^{amb}) \qquad (34)$$

with:

$$g_{CO_2}^{tc/col} = 1 + \frac{D_{air}(T^{10})}{D_{CO_2}^{b:air}},$$

as defined above.

$D_{CO_2}^{skin}$ is defined in relation to expression (48).

For the partial pressure, we have the relationship:

$$P_{CO_2}^{tc}(T^{tc}) = \frac{T^{tc}}{T^{10}}\left[g_{CO_2}^{tc/col} \cdot P_{CO_2}^{10}(T^{10}) - \frac{D_{air} P_{CO_2}^{amb}(T^{10})}{k_{blood} \cdot \rho_{skin}^{blood} \cdot S_{skin} \cdot H_{b:air}}\right] \qquad (35)$$

where:

$$P_{CO_2}^{tc}(T^{tc}) = \frac{T^{TC}}{T^{10}}\left[P_{CO_2}^{10}(T^{10}) + \frac{D_{air}}{D_{CO_2}^{b:air}} \cdot [P_{CO_2}^{10}(T^{10}) - P_{CO_2}^{amb}(T^{10})]\right] \qquad (36)$$

Step 140: Estimating the Partial Pressure of $CO_2$ in the Blood.

This step aims to determine a function $f$, such that:

$$P_{CO2}^{blood} = f(P_{CO2}^{tc}) \qquad (40)$$

where:

$P_{CO2}^{tc}$ is the partial pressure of transcutaneous $CO_2$ in step 130;

$P_{CO2}^{blood}$ is the partial pressure of $CO_2$ in the blood, this being the physiological quantity that the method is aimed at estimating.

In this step, it is assumed, according to a first variant, that the partial pressure of $CO_2$ in the collecting chamber $P_{CO2}^{10}$ corresponds to the partial pressure of transcutaneous $CO_2$ $P_{CO2}^{tc}$.

The partial pressure of $CO_2$ in the blood may be estimated via an empirical formula given in J. W. Severinghaus "The current status of transcutaneous blood gas analysis and monitoring", Blood Gas News, vol. 7, no 2, pp 4-9, 1998.

$$P_{CO2}^{blood}(37°\ C.) = \frac{P_{CO2}^{blood}(T^{tc}) - 4}{e^{(0.046\ (T^{tc}-37))}} \qquad (41)$$

where $T^{tc}$ is a temperature measured by the temperature sensor 17'.

When using formula (41), the temperatures are expressed in ° C. and the pressures are expressed in mmHg.

Other methods may be applied to estimate $P_{CO2}^{blood}$ on the basis of $P_{CO2}^{tc}$. According to a first variant, this estimation may be based on modeling of the flow $\Phi_{CO2}$ of transcutaneous $CO_2$ diffusing through the skin.

The gas flow $\Phi_{CO_2}^{g,blood\ to\ collection}$ of $CO_2$ through the skin is modeled by:

an equation of gas-phase diffusion through the skin (skin effect):

$$\Phi_{CO_2}^{g,blood\ to\ collection} = S_{blood} \cdot D_{skin}^{bin} \cdot (C_{CO_2}^{g,blood} - C_{CO_2}^{col}) \qquad (40)$$

$D_{skin}^{bin}$ is a binary diffusion coefficient of the skin (m·s$^{-1}$) corresponding to the coefficient of mass transfer of carbon dioxide through the skin. It is determined either experimentally from skin biopsies, or numerically, the parameters of the model being trained on people for whom reference measurements of carbon-dioxide concentration have been taken using another technique for measuring carbon-dioxide concentration in the blood (blood samples, measurement of exhaled air, measurement of transcutaneous pressure using electrochemical sensors, etc.), the parameters being adjusted to make the pressures estimated by the device correspond to the measured reference pressures.

$C_{CO_2}^{g,blood}$ is a molar gas-phase concentration of $CO_2$ in the blood (mol·mm$^{-3}$) in equilibrium with the liquid-phase concentration, according to Henry's law:

$$C_{CO_2}^{g,blood} = \sigma_{CO_2} \cdot P_{CO_2}^{blood} \qquad (41)$$

$P_{CO_2}^{blood}$ is the partial pressure of $CO_2$ in the blood, expressed in mmHg (millimeters of mercury), and $\sigma_{CO_2}$ is the Ostwald solubility coefficient, which may be such that:

$$\sigma_{CO_2} = 3.3 \times 10^{-2}\ \frac{mM}{mmHg} \qquad (42)$$

$C_{CO_2}^{col,*}$ is the molar concentration of $CO_2$ that there would be in equilibrium in the collecting chamber if carbon dioxide were not removed by convection. It is also the concentration that exists in the collecting chamber against the skin. It is the transcutaneous concentration corresponding to the transcutaneous pressure.

$C_{CO_2}^{col}$ is the molar concentration of $CO_2$ in the collecting chamber 10.

Because of the removal, by convection, of $CO_2$ from the collecting chamber, the concentration $C_{CO_2}^{col}$ is different from the concentration $C_{CO_2}^{col,*}$.

The equation of mass transfer between the liquid phase and the gas phase related solely to the phase change is written:

$$\Phi_{CO_2}^{g,blood\ to\ collection} = -S_{blood} k_{blood} H_{b:air} \cdot (C_{CO_2}^{col} - C_{CO_2}^{col,*}) \quad (43)$$

By combining the two mass-transfer equations, the following is obtained:

$$\Phi_{CO_2}^{blood\ to\ collection} = -S_{blood} k_{CO_2}^{blood\ to\ col} \cdot (C_{CO_2}^{col} - C_{CO_2}^{g,blood}) \quad (44)$$

where $K_{CO_2}^{blood\ to\ col}$ is the coefficient of total mass transfer combining the phase change and diffusion through the skin:

$$\frac{1}{K_{CO_2}^{blood\ to\ col}} = \frac{1}{k_{blood} H_{b:air}} + \frac{1}{D_{skin}^{bin}} \quad (45)$$

The following expression may be deduced from the above:

$$P_{CO_2}^{blood}(T^{tc}) = \frac{T^{tc}}{T^{10}} \cdot g_{CO_2}^{blood/col} \cdot P_{CO_2}^{10}(T^{10}) \quad (46)$$

$g_{CO_2}^{blood/col}$ is a correction factor that corrects for the effect of dilution in the collecting chamber, for the effect of diffusion through the skin, and for the effect of change of phase from blood to air.

$$g_{CO_2}^{blood/col} = \frac{\rho_{skin}^{blood} \cdot S_{11} \cdot K_{CO_2}^{blood\ to\ col} + D_{air}}{\rho_{skin}^{blood} \cdot S_{11} \cdot K_{CO_2}^{blood\ to\ col}} \quad (47)$$

Consequently $$P_{CO_2}^{blood}(T^{tc}) = P_{CO_2}^{tc}(T^{tc}) + \frac{T^{tc}}{T^{10}} \cdot \frac{D_{air}}{D_{CO_2}^{skin}} P_{CO_2}^{10}(T^{10}) \quad (48)$$

where:

$D_{CO_2}^{skin}$ is a volumetric flow rate of diffusion of $CO_2$ through the skin, such that:

$$D_{CO_2}^{skin} = \rho_{skin}^{blood} \cdot S_{skin} \cdot D_{skin}^{bin} \quad (49)$$

$D_{air}(T^{10})$ is a volumetric flow rate of ambient air in the collecting chamber, such that:

$$D_{air}(T^{10}) = R \cdot T^{10} \frac{(P_{air}^{out\ col}(T^{10}) - P_{air}^{amb}(T^{10}))}{P_{air}^{out\ col}(T^{10}) \cdot R^{col-amb}} \quad (50)$$

$P_{CO_2}^{amb}(T^{10})$ is the $CO_2$ pressure, in the collecting chamber, due to the ambient air, such that:

$$P_{CO_2}^{amb}(T^{10}) = \frac{T^{10}}{T^{amb}} \cdot P_{CO_2}^{amb}(T^{amb}) \quad (51)$$

$R^{col-amb}$ corresponds to the fluid resistance between the ambient air and the collecting chamber.

The partial pressure $P_{CO_2}^{blood}$ estimated using the above formulas is estimated at the temperature of the collecting chamber 10, which is above 37° C. However, the blood is at a temperature of 37° C. It is therefore necessary to make a correction in order to obtain an estimate of $P_{CO_2}^{blood}$. Such a correction may be made according to J. W. Severinghaus "The current status of transcutaneous blood gas analysis and monitoring", Blood Gas News, vol. 7, no 2, pp 4-9, 1998, the latter defining a transfer function $f$, such that:

$$f = \frac{P_{CO2}^{blood}(T^{10})}{P_{CO2}^{blood}(T = 37°\ C.)} = e^{0.046[T^{10} - 37]} \quad (52)$$

where $T^{10}$ is the temperature in the collecting chamber 10. Thus:

$$P_{CO_2}^{blood}(37°\ C.) = \frac{P_{CO_2}^{blood}(T^{10})}{\exp(0.046[T^{10} - 37])} \quad (53)$$

The partial pressure output from the preceding equation is expressed in mmHg.

According to a second variant, the $CO_2$ present in the ambient air admitted into the collecting chamber through the through-apertures is taken into account. The equations presented with reference to the first variant become:

$$P_{CO_2}^{tc}(T^{tc}) = \frac{T^{tc}}{T^{10}} \left[ g_{CO_2}^{blood/col} \cdot P_{CO_2}^{col}(T^{10}) - \frac{D_{air} \cdot P_{CO_2}^{amb}(T^{10})}{K_{CO_2}^{blood\ to\ col} \cdot \rho_{skin}^{blood} \cdot S_{skin}} \right] \quad (55)$$

$g_{CO_2}^{blood/col}$ is a correction factor that corrects for the effect of dilution in the collecting chamber, for the effect of diffusion through the skin, and for the effect of change of phase from blood to air.

$$g_{CO_2}^{blood/col} = \frac{\rho_{skin}^{blood} \cdot S_{skin} \cdot K_{CO_2}^{blood\ to\ col} + D_{air}}{\rho_{skin}^{blood} \cdot S_{skin} \cdot K_{CO_2}^{blood\ to\ col}} \quad (56)$$

that is $g_{CO_2}^{blood/col} = 1 + \dfrac{D_{air}}{\rho_{skin}^{blood} \cdot S_{skin} \cdot K_{CO_2}^{blood\ to\ col}}$ \quad (57)

so $g_{CO_2}^{blood/col} = 1 + \dfrac{D_{air}}{\rho_{skin}^{blood} \cdot S_{skin}} \left[ \dfrac{1}{k_{blood} H_{b:air}} + \dfrac{1}{D_{skin}^{bin}} \right]$ \quad (58)

It may be deduced therefrom that:

$$P_{CO_2}^{blood}(T^{tc}) = P_{CO_2}^{tc}(T^{tc}) + \frac{T^{tc}}{T^{10}} \cdot \frac{D_{air}}{D_{CO_2}^{skin}} \left[ P_{CO_2}^{tc}(T^{10}) - P_{CO_2}^{amb}(T^{10}) \right] \quad (59)$$

$D_{CO_2}^{skin}$ is a volumetric flow rate of diffusion of $CO_2$ through the skin, such that:

$$D_{CO_2}^{skin} = \rho_{skin}^{blood} \cdot S_{skin} \cdot D_{skin}^{bin} \quad (60)$$

$D_{air}(T^{10})$ is a volumetric flow rate of ambient air in the collecting chamber, such that:

$$D_{air}(T^{10}) = R \cdot T^{10} \frac{(P_{air}^{out\ col}(T^{10}) - P_{air}^{amb}(T^{amb}))}{P_{air}^{out\ col}(T^{10}) \cdot R^{col-amb}} \quad (61)$$

$P_{CO_2}^{amb}(T^{10})$ is the $CO_2$ pressure, in the collecting chamber, due to the ambient air, such that:

$$P_{CO_2}^{amb}(T^{10}) = \frac{T^{10}}{T^{amb}} \cdot P_{CO_2}^{amb}(T^{amb}) \quad (62)$$

$$P_{CO2}^{blood} = \frac{P_{CO2}^{10}}{P_{air}^{10}}\left[P_{air}^{amb}\frac{T^{10}}{T^{amb}}\sqrt{\frac{S^{15}}{S^{11}}} + \frac{(P_{air}^{10} - P_{air}^{amb})}{R^{col-amb}S_{skin}\sigma_{CO2}D}\right] \quad (63)$$

Taking into account the Severinghaus model:

$$P_{CO_2}^{blood}(37° \text{ C.}) = \frac{P_{CO_2}^{blood}(T^{10})}{\exp(0.046[T^{10} - 37])} \quad (64)$$

In the preceding expression, $T^{10}$ is expressed in ° C.

Step 90: Calibrating the Model

Step 100 requires the model parameters $m_1$, $n_1$, $m_2$, $n_2$, et q and the values of the powers $u_1$, $u_2$ to have been provided. To do this, prior to the implementation of the method, a calibration is carried out with the aim of determining the values of the parameters and of the powers. The calibration may be a supervised calibration, using a number $N_{cal}$ of calibration samples the $CO_2$ content of which is known.

The parameters and powers are estimated by minimizing a functional J, such $$\text{that } J = \sum_{i=1}^{N_{cal}}\left[-\ln\left[\frac{\frac{U_i(\lambda_1)}{U_i(\lambda_2)}}{\frac{U_0(\lambda_1)}{U_0(\lambda_2)}}\right] - A_i\right]^2 \quad (70)$$

with $$A_i = m_1 C_{iCO2}^{u_1} + n_1 C_{iCO2}^{2u_1} + m_2 C_{iH2O}^{u_2} + n_2 C_{iH2O}^{2u_2} + q C_{iCO2}^{u_1} \cdot C_{iH2O}^{u_2}$$

In other words, $$\{m_1, n_1, m_2, n_2, q, u_1, u_2\} = \quad (71)$$

$$\text{argmin } J = \text{argmin}\left(\sum_{i=1}^{N_{cal}}\left[-\ln\left[\frac{\frac{U_i(\lambda_1)}{U_i(\lambda_2)}}{\frac{U_0(\lambda_1)}{U_0(\lambda_2)}}\right] - A_i\right]^2\right)$$

Generally, it is a question of determining parameters such that, taking into account the known $CO_2$ concentration, the application of the model approaches most closely the measured quantities.

Since the model is non-linear, the set of parameters $\{m_1, n_1, m_2, n_2, q, u_1, u_2\}$ minimizing J may be determined by implementing a Levenberg-Marquardt algorithm.

A regularizing term may be introduced to make the estimation of the parameters more robust to measurement errors and to the approximations of the model:

$$\{m_1, n_1, m_2, n_2, q, u_1, u_2\} = \text{argmin } J$$

$$= \text{argmin}\left(\frac{1}{N_{cal}}\sum_{i=1}^{N_{cal}}\left[-\ln\left[\frac{\frac{U_i(\lambda_1)}{U_i(\lambda_2)}}{\frac{U_0(\lambda_1)}{U_0(\lambda_2)}}\right] - A_i\right]^2 + \quad (72)\right.$$

$$\left.\omega\frac{1}{dim(\{m_1, n_1, m_2, n_2, q, u_1, u_2\})}\|\{m_1, n_1, m_2, n_2, q, u_1, u_2\}\|^2\right)$$

where:
$dim(\{m_1, n_1, m_2, n_2, q, u_1, u_2\})$ is the dimension of the vector of parameters, which in this case is equal to 7
$\|\{m_1, n_1, m_2, n_2, q, u_1, u_2\}\|$ is the norm of the vector of parameters. In the case of a quadratic norm:

$$\|\{m_1, n_1, m_2, n_2, q, u_1, u_2\}\|^2 = m_1^2 + n_1^2 + m_2^2 + n_2^2 + q^2 + u_1^2 + u_2^2$$

The parameter $\omega$ may be chosen a priori, or determined automatically using techniques such as cross-validation.

To force the model to resemble a standard quadratic linear model, the powers may be required to be close to 1. In this case:

$$\{m_1, n_1, m_2, n_2, q, u_1, u_2\} = \quad (73)$$

$$\text{argmin } J = \text{argmin}\left(\frac{1}{N_{cal}}\sum_{i=1}^{N_{cal}}\left[-\ln\left[\frac{\frac{U_i(\lambda_1)}{U_i(\lambda_2)}}{\frac{U_0(\lambda_1)}{U_0(\lambda_2)}}\right] - A_i\right]^2 + \right.$$

$$\left.\omega\frac{1}{dim(\{m_1, n_{1-1}, m_2, n_2 - 1, q, u_1, u_2\})}\right.$$

$$\left.\|\{m_1, n_1 - 1, m_2, n_2 - 1, q, u_1, u_2\}\|^2\right)$$

During training tests, the dilution correction factor $g_{CO_2}^{tc/col}$ may be estimated by carrying out a plurality of training acquisitions on volunteers for whom reference measurements, either of transcutaneous pressure or of blood pressure, are carried out at the same time as the measurement of the device. The average value of the factor $g_{CO_2}^{tc/col}$ to be applied so that the estimated values of transcutaneous pressure $P_{CO_2}^{tc}(T^{tc})$ approach as closely as possible the measured reference transcutaneous-pressure values, or so that the estimated values of blood pressure $P_{CO_2}^{blood}(37° \text{ C.})$ approach as closely as possible the measured reference blood-pressure values, is then estimated.

Example of Gas-Phase Calibration

In a first example, the nonlinear model described in expression (3) was calibrated, in step 90, by feeding the measuring chamber with a gas the $CO_2$ concentration of which described, in each trial, concentration plateaux equal to 0, 0.2, 0.4, 0.8, 1.6 and 3.2 mol/m³, respectively. 12 trials were carried out, while varying the temperature $T^{20}$ of the measuring chamber 20, the water concentration value $C_{H2O}$, and the temperature $T^{10}$ in the collecting chamber 10.

Table 1 shows the experimental parameters taken into account in each trial.

TABLE 1

| Trial | $C_{H2O}$ (mol/m³) | $T^{10}$ (° C.) | $T^{20}$ (° C.) |
|---|---|---|---|
| 1 | 0.126 | 30.1 | 30.3 |
| 2 | 0.301 | 39.7 | 32.0 |
| 3 | 0.365 | 37 | 32.4 |
| 4 | 0.364 | 39.7 | 31.8 |
| 5 | 0.691 | 40.1 | 32.2 |
| 6 | 0.428 | 30.2 | 30.2 |
| 7 | 0.623 | 37.1 | 32.0 |
| 8 | 0.898 | 40.1 | 31.5 |
| 9 | 0.863 | 37.2 | 31.6 |
| 10 | 0.609 | 30.3 | 30.3 |
| 11 | 0.753 | 30.1 | 30.2 |
| 12 | 1.160 | 37.1 | 32.3 |

The parameters and powers of the model were estimated using three models:
model A: without taking into account water vapor, such as described with reference to expression (3');
model B: model of expression (3) without taking into account the bilinear term, this amounting to setting q=0;
model C: model of expression (3).

Table 2 collates the model parameters obtained following the minimization described in step 90.

TABLE 2

| Parameters | Model A | Model B | Model C |
|---|---|---|---|
| ln( ) | 1.08 | 0.99 | 1.07 |
| $m_1$ | 0.29 | 0.29 | 0.29 |
| $u_1$ | 0.61 | 0.59 | 0.57 |
| $n_1$ | 0.051 | 0.048 | 0.044 |
| $m_2$ |  | 0.0040 | 0.0015 |
| $u_2$ |  | 0.12 | 2.45 |
| $n_2$ |  | 0.065 | 0.00001 |
| q |  |  | 0.00028 |

In table 2, the parameter ln( ) corresponds to $$\ln\left[\frac{U_0(\lambda_1)}{U_0(\lambda_2)}\right].$$

This value was measured before carrying out the trials, in the absence of $CO_2$ from the measuring chamber.

The three models were compared by comparing, during each trial, and for each $CO_2$ concentration, the measured values with the actual values of the concentrations. For each model, a root-mean-square error (RMSE) and the coefficient of determination ($R^2$) were calculated. Table 3 collates the obtained results.

TABLE 3

| Model | RMSE | $R^2$ |
|---|---|---|
| A | 0.0180 | 0.982 |
| B | 0.0140 | 0.989 |
| C | 0.0133 | 0.990 |

The results collated in table 3 show that model C, such as described with reference to expression (3), has the lowest RMSE and the highest coefficient of determination. It is therefore optimal. It may also be seen that taking into account water-vapor concentration (models B and C) allows performance to be improved.

FIG. 7A shows, for each trial, the exact measured values of $$-\ln\left[\frac{U(\lambda_1)}{U(\lambda_2)}\right]$$

(crosses) and the values of $$-\ln\left[\frac{U(\lambda_1)}{U(\lambda_2)}\right]$$

calculated implementing model C (circles). The consistency between the measured and calculated values may be seen, this attesting to the appositeness of the model.

Liquid-Phase Calibration

In order to estimate the constants of the fluidic model, it is also possible to carry out a calibration using mixtures in a reference liquid such as water, for known $CO_2$ concentrations. The $CO_2$ dilution required to achieve the mixtures may be accelerated using a bubbler and a mixer. Various techniques allow the concentration of $CO_2$ dissolved in a liquid, water for example, to be controlled, for example use of a dedicated probe, for example a submersible probe "Membrane/NDIR $CO_2$ probe" sold by AquaMS. The concentration of dissolved $CO_2$ may also be obtained by measuring pH (hydrogen-ion content) and kH (carbonate-ion content). The carbon dioxide released from the mixture is measured with the device such as described above. The concentration of carbon dioxide dissolved in the water is estimated. The model parameters are estimated so as to minimize the error between the estimated carbon-dioxide concentration and the physical concentrations of the standard mixtures.

Training-Based Calibration on Volunteers

In order to estimate the parameters related to the properties of the skin and of the blood, and also to calibrate the parameters of the models, it is possible to carry out training measurements on volunteers for whom reference measurements are also carried out. These reference measurements may be assays on blood samples, or measurements of exhaled air, or a measurement of transcutaneous pressure using a commercial device such as an electrochemical measuring device. The coefficients of the model that are not measured by sensors are estimated by taking an average value that will be applied to all of the training measurements. These parameters are estimated by minimizing the quadratic deviation between the pressures estimated by the model on the basis of the measurements carried out by a device 1 as described above and the pressures delivered by the reference devices.

Trial on a User

The device 1 was applied against the forearm at the elbow crease of a healthy user undergoing a cardiopulmonary exercise test. In this test, the user was placed on a bicycle and the effort required from him modulated via pedaling speed. After a period of rest, lasting 9 minutes, 4 stages of cycling for 5 minutes were undergone, the pedaling speed gradually being increased. Two recovery stages were then administered: one at slow speed, the other at rest. FIG. 7B shows a variation in the partial pressure of $CO_2$ $P_{CO2}^{10}$ in the collecting chamber, as measured by implementing steps 100 to 120 described above. The measurement points have been represented by dark crosses. The y-axis corresponds to the estimated partial pressure, whereas the x-axis corresponds to time. Given the magnitude of the noise, relative to the dynamic range of the signal, the measured values were smoothed either via a moving average of 100 s width (curve a), or via a polynomial of order 3 (curve b). The smoothed values are consistent with the variation in the partial pressure of $CO_2$ in the blood during cardiopulmonary exercise according to such a protocol.

The invention claimed is:

1. A measuring device, configured to be placed on the skin of a user, the user being a human being or an animal, the device extending between a contact face, configured to be applied against the skin of the user, and a far end, the device comprising a side wall, that extends between the contact face and the far end, the device comprising:
    on the contact face, at least one aperture, configured to collect a transcutaneous gas of interest emitted through the skin, the at least one aperture being formed through the contact face;
    a collecting chamber, extending between the contact face and a measuring chamber;
    a gas sensor, placed in the measuring chamber, and configured to measure a first concentration of the gas of interest flowing through the measuring chamber;
    processing circuitry configured to estimate a gas-of-interest content in the body of the user based on the measurement provided by the gas sensor; and
    a heat source, configured to bring the contact face to a temperature above 37° C.,
    wherein the device further comprises:
        a side aperture, forming an air intake, the side aperture being formed through the side wall and configured to admit ambient air into the collecting chamber such that, under an effect of the temperature produced by the heat source, a convection current of air is generated, so that the air admitted into the collecting chamber through the side wall carrying the transcutaneous gas of interest to the measuring chamber, the air and the transcutaneous gas of interest forming a gas mixture extending into the measuring chamber.

2. The device of claim 1, wherein the gas sensor is further configured to measure the first concentration of the gas of interest, which is carbon dioxide.

3. The device of claim 1, further comprising a humidity sensor configured to determine a humidity level in the measuring chamber, wherein the processing circuitry is further configured to take into account the determined humidity level in the measuring chamber to estimate the first concentration of the gas of interest in the measuring chamber.

4. The device of claim 1, further comprising a pressure sensor configured to determine a pressure in the measuring chamber, wherein the processing circuitry is further configured to take into account the determined pressure in the measuring chamber to estimate a partial pressure of the gas of interest in the collecting chamber.

5. The device of claim 1, wherein the gas sensor is an optical sensor that comprises an infrared radiation source and a photodetector, the infrared radiation source and the photodetector being arranged such that the gas mixture flows, in the measuring chamber, between the infrared radiation source and the photodetector, the photodetector comprising two measurement channels configured to measure infrared radiation, emitted by the infrared radiation source, and having propagated through the measuring chamber in, respectively:
    a measurement spectral band that correspond to an absorption spectral band of the gas of interest; and
    a reference spectral band, considered as not absorbed by the gas of interest.

6. The device of claim 1, further comprising:
    an auxiliary measuring chamber configured to be filled by the ambient air extending around the device; and
    an auxiliary gas-of-interest sensor, placed in the auxiliary measuring chamber, and configured to measure a second concentration of the gas of interest in the ambient air filling the auxiliary measuring chamber,
    wherein the processing circuitry is further configured to take into account the second concentration of the gas of interest measured by the auxiliary gas-of-interest sensor to estimate the gas-of-interest content in the body of the user.

7. The device of claim 6, wherein the auxiliary gas-of-interest sensor is an optical sensor that comprises an auxiliary infrared radiation source and an auxiliary photodetector, the auxiliary infrared radiation source and the auxiliary photodetector being arranged such that ambient air extends, in the measuring chamber, between the auxiliary infrared radiation source and the auxiliary photodetector, the auxiliary photodetector comprising two measurement channels configured to measure infrared radiation, emitted by the auxiliary infrared radiation source, and having propagated through the auxiliary measuring chamber in, respectively:
    a measurement spectral band that correspond to an absorption spectral band of the gas of interest; and
    a reference spectral band, considered as not absorbed by the gas of interest.

8. The device of claim 1, further comprising:
    a sensor of ambient air pressure, the ambient air extending around the device; and/or
    a sensor of ambient air temperature; and/or
    a sensor of pressure in the collecting chamber; and/or
    a sensor of temperature in the collecting chamber; and/or
    a temperature sensor configured to measure a skin temperature; and/or
    a sensor of temperature in the measuring chamber.

9. A method for estimating the gas-of-interest content in the blood of the user, using the device of claim 1, the device being applied such that the contact face is placed facing the skin of the user, the method comprising:
    heating the contact face and admitting ambient air through the side wall of the device:
        estimating the first concentration of the gas of interest in the measuring chamber;
        based on the estimated first concentration of the gas of interest, computing a partial pressure of the gas of interest in the collecting chamber; and
        based on the computed partial pressure of gas of interest in the collecting chamber, estimating a partial pressure of the gas of interest dissolved in blood of the user.

10. The method of claim 9, wherein the step of estimating the partial pressure of the gas of interest further comprises:
    based on the partial pressure of the gas of interest in the collecting chamber, estimating a partial pressure of the transcutaneous gas of interest having diffused through the skin of the user; and
    based on the estimated partial pressure of the transcutaneous gas of interest, estimating the partial pressure of the gas of interest dissolved in the blood of the user.

11. The method of claim 9, further comprising measuring a second concentration of the gas of interest in the ambient air, the measured second concentration being taken into account in the step of estimating the partial pressure of the gas of interest dissolved in the blood of the user.

12. The method of claim 9, further comprising measuring an ambient air pressure, the ambient air pressure being taken into account in the step of estimating the partial pressure of the gas of interest dissolved in the blood of the user.

13. The method of claim 9, wherein the step of estimating the first concentration of the gas of interest is implemented using the gas sensor, placed in the measuring chamber, and formed by an infrared radiation source and by a photodetector comprising two measurement channels configured to measure infrared radiation, emitted by the infrared radiation source, and having propagated through the measuring chamber in, respectively:
- a measurement spectral band that corresponds to an absorption spectral band of the gas of interest; and
- a reference spectral band, considered as not absorbed by the gas of interest; and wherein the step of estimating the first concentration of the gas of interest further comprises
  - comparing signals respectively generated by the two measurement channels; and
  - solving a second-degree polynomial, the polynomial being defined by predetermined parameters as well as by the comparison of signals respectively generated by the two measurements channels, so as to estimate the concentration of the gas of interest in the measuring chamber.

14. The method of claim 13, wherein the root of the polynomial is a non-integer power of the concentration of the gas of interest in the measuring chamber.

15. The method of claim 13, wherein the parameters of the second-degree polynomial are defined in a supervised calibrating phase, using calibration samples having a known concentration of the gas of interest.

16. The method of claim 13, wherein the step of estimating the first concentration of the gas of interest further comprises measuring a water-vapor content in the measuring chamber, so that the water-vapor content is taken into account in the estimation of the first concentration of the gas of interest in the measuring chamber.

17. The method of claim 13, wherein the measurement spectral band is variable, so as to address various gases of interest.

18. The method of claim 9, further comprising measuring a temperature in the measuring chamber and a temperature in the collecting chamber, wherein the step of computing the partial pressure further comprises taking into account the measured temperatures.

19. The method of claim 9, further comprising measuring a pressure in the measuring chamber and a pressure in the collecting chamber, wherein the step of computing the partial pressure further comprises taking into account the measured pressures.

20. The method of claim 9, wherein the gas of interest is carbon dioxide.

* * * * *